Oct. 17, 1967  G. R. DRENGLER  3,347,708
FUEL CELL BATTERY CONTAINING METAL COATED CARBON ELECTRODES
Filed June 15, 1965
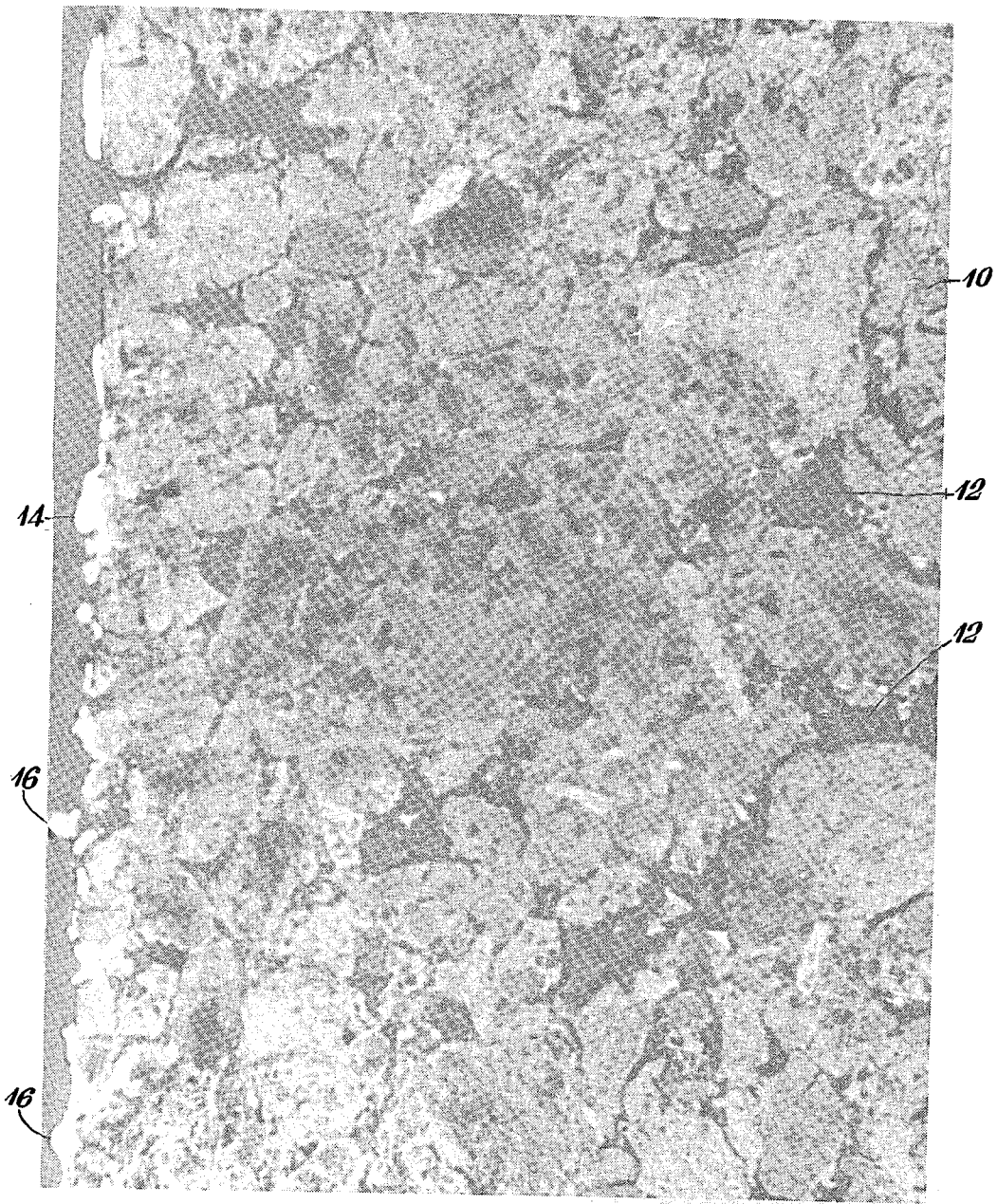
INVENTOR
GEORGE R. DRENGLER
BY
ATTORNEY

United States Patent Office 3,347,708
Patented Oct. 17, 1967

3,347,708
FUEL CELL BATTERY CONTAINING METAL COATED CARBON ELECTRODES
George R. Drengler, North Olmsted, Ohio, assignor to Union Carbide Corporation, a corporation of New York
Filed June 15, 1965, Ser. No. 469,038
3 Claims. (Cl. 136—86)

This application is a continuation-in-part of application Serial Number 108,364 filed May 8, 1961, and now abandoned, and application Serial Number 108,400 filed May 8, 1961, now U.S. Patent 3,278,336.

This invention relates to electrodes suited for use in fuel cells. More particularly, the invention relates to flat fuel cell electrodes having a discontinuous coating of metal on their gas surfaces and to fuel cell batteries containing such electrodes.

Fuel cells and electrodes for use in fuel cell batteries have been known for some time. One type of fuel cell offering exceptional promise utilizes carbon electrodes of appropriate porosity and activity and containing suitable catalysts. The electrodes of such a cell are in contact with liquid electrolyte, gaseous hydrogen is supplied to one electrode and gaseous oxygen to the other. Most operative fuel cells of this type have employed tubular electrodes but it is apparent that cells made up of flat electrodes are more amenable to convenient arrangement in forming batteries.

One problem encountered in attempts to provide batteries of flat fuel cells is that of making low resistance contact between electrodes. In the flat fuel cells so far devised, one side of a flat carbon electrode is placed in contact with electrolyte, this side being referred to as the electrolyte face. The desired gas is supplied to the other side of the electrode, generally hydrogen if the electrode is the anode or oxygen if the electrode is the cathode. This side of the electrode is referred to as the gas face.

When the cells are assembled in series relationship to form a battery, the gas face of one electrode must be in electrical contact with the gas face of another electrode of opposite polarity. Unless good electrical contact is provided, the electrical resistance of the junction between cells is high and the efficiency of the battery is seriously impaired. In practice it has been found most difficult to achieve a low resistance contact without interfering to an undesired degree with the flow of gases to the gas face of the electrodes.

It is the principal object of this invention to provide a fuel cell electrode having a gas face which, when placed in a juxtaposition with a similar electrode of opposite polarity in a battery, will make a good, relatively low resistance contact with it.

The invention by which this object is obtained comprises a gas permeable carbon electrode having a discontinuous coating of metal on its surface. The metal of which the coating is formed should be inert to the electrolyte of the cell. The metal can be for example, nickel, silver, titanium or stainless steel, but nickel is preferred.

The accompanying drawing is a reproduction on a somewhat enlarged scale of a photomicrograph originally taken at a magnification of 130 diameters. The photomicrograph shows a portion of an electrode embodying the invention.

By reference to the drawing it will be seen that an electrode 10, having a number of randomly distributed pores 12 therein, is provided on one surface with a discontinuous layer or coating 14 of metal which does not penetrate to any significant degree into the pores. It will also be observed that the coating 14 is quite rough and exhibits a number of protuberances or peaks 16. It is these peaks 16 which make possible a low resistance contact between the surfaces of electrodes embodying the invention when their gas faces are placed in juxtaposition with metal conductors between such faces.

The metal coating is quite thin, generally not being more than about 0.002 inch in thickness. A coating containing about 0.009 to 1.2 grams of metal per square inch of electrode surface will produce a coating of desired thickness. A generally preferred coating is about 0.02 to 0.09 gram of metal per square inch of electrode surface. Greater thicknesses of metal coating do not improve contact resistance significantly and may interfere with access of gas to the electrode.

The metal coating of desired characteristics is attained by spraying the surface to be coated with molten metal by means of conventional metal spraying techniques. This method of producing the coating is preferred since the desired discontinuity is produced by a splattering effect when the molten metal strikes the electrode surface.

Electrode units in which the gas face of the electrode has a discontinuous coating of metal according to this invention are particularly useful in fuel cell batteries made up of a plurality of flat carbon electrodes. A variety of flat electrode structures and fuel cell battery constructions employing such electrodes are known. Also, numerous methods for supporting flat carbon electrodes in conductive or nonconductive frames together with various methods for supplying electrolyte and gases to the appropriate surfaces of the electrodes in fuel cell batteries have been devised and are well known to persons familiar with the fuel cell battery art.

In one particularly useful type of construction, the fuel cell battery is made up of a plurality of flat, gas permeable carbon electrode units arranged with the gas faces of electrodes of different polarity adjacent to each other. Electrical contact between the cells of the battery is made through a metal conductor element located between the gas faces of the electrodes. This metal conductor element, which is generally large enough to be coextensive with the electrode surface, also serves as a gas partition to ensure delivery of the desired gas to the particular electrode face and to prevent intermingling of the gases used. In this construction, the (gas-impervious) metal conductor element is in electrical contact with the gas faces of the electrodes, and also serves to define a gas space between each electrode gas surface and the adjacent surface of the metal conductor element. In a preferred construction, the metal conductor element is a corrugated metal conductor plate. The corrugations on the conductor plate make electrical contact with the gas faces of the electrodes of the adjacent cell units, and the corrugations also provide passages on each side of the plate for uniformly distributing the fuel or oxidant gases over the appropriate gas face of the electrodes of the adjacent cells.

A typical fuel battery construction employing flat carbon electrodes separated by metal conductor plates is set forth in the aforementioned application Serial No. 108,400, the disclosure and drawings of which are incorporated herein by reference, and in French Patent No. 81,971 which is a patent of addition to French Patent No. 1,250,769. French Patent No. 81,971 is the French language equivalent of application Serial No. 108,400.

A number of electrodes embodying the invention were prepared and assembled in a battery by stacking the necessary cell elements with metal conductors between appropriate surfaces. The stack was assembled under pressure by tightening bolts holding the stack together. Entirely similar assemblies were made, except that the electrodes were not coated in accordance with the invention, and the contact resistance between electrodes was determined for each. The resistance in the case of the electrodes of this invention was consistently less than onefifth of that of the electrodes not embodying the invention. In the following table these results are summarized. The electrodes were five and ¾ inches by six and ⅛ inches and ¼ inch in thickness. Those made according to the invention had a nickel coating containing 0.5 to 1.0 grams of nickel per electrode which had been applied by spraying.

| Carbon Surface Treatment | Assembly Pressure Torque (inch-pounds) | Resistance (milliohms) |
|---|---|---|
| None | 30 | 4.2 |
| Do | 40 | 3.8 |
| Do | 50 | 3.4 |
| Nickel Coated | 10 | 0.6 |
| Do | 30 | 0.6 |
| Do | 50 | 0.6 |

The metal conductors employed in these assemblies were made of corrugated stainless steel 0.002 inches thick. It will be seen from the data that it was unnecessary to assembly the stacked cells under heavy pressure to attain low resistance when electrodes embodying the invention were used and that, even with heavy endwise pressure, the resistance between electrodes in the batteries containing electrodes not metal coated was more than five times as high as that when the electrodes of the invention were used.

Gas permeability of electrodes measured before and after metal spraying (with 0.5 to 1.0 grams of metal per electrode) show no significant reduction of gas flow as a result of the metal deposit.

The principles of the present invention are useful generally in many applications wherein low electrical resistance is required between contacting surfaces of similar or dissimilar types. Its main application lies with flat plate fuel cell batteries such as those described hereinabove. The subject coatings, it should be noted, may be applied to other than flat surfaces.

What is claimed is:

1. A fuel cell battery comprising a plurality of pairs of substantially flat, gas permeable carbon electrodes, each electrode having an electrolyte face and a gas face; the gas faces of said electrodes being arranged in juxtaposition with a gas impervious metal conductor element therebetween; said metal conductor element being in electrical contact with said gas faces and defining gas spaces between said gas faces and the surfaces of said metal conductor element, said electrodes having on said gas faces thereof a gas permeable discontinuous metal coating having a plurality of protuberances in low electrical resistance contact with said metal conductor element; said metal coating being applied to said electrode surfaces by molten metal spray techniques, and said coating being present in an amount between about 0.009 gram and about 1.2 grams of metal per square inch of electrode surface.

2. A fuel battery in accordance with claim 1 wherein said coating is composed of a metal selected from the group consisting of nickel, stainless steel, silver and titanium in low electrical resistance contact with said metal conductor element; said metal coating being present in an amount between about 0.02 gram and about 0.09 gram of metal per square inch of electrode surface.

3. A fuel battery in accordance with claim 1 wherein said coating is composed of nickel in low electrical resistance contact with said metal conductor element; said nickel coating being not more than about 0.002 inch thick and being present in an amount between about 0.02 gram and about 0.09 gram of nickel per square inch of electrode surface.

References Cited

UNITED STATES PATENTS

| 3,092,517 | 6/1963 | Oswin | 136—86 |
| 3,110,622 | 11/1963 | Hipp | 136—86 X |
| 3,134,696 | 5/1964 | Douglas et al. | 136—86 |
| 3,188,242 | 6/1965 | Kordesch et al. | 136—86 |

ALLEN B. CURTIS, *Primary Examiner.*

WINSTON A. DOUGLAS, *Examiner.*